US012641215B2

(12) United States Patent
Takahashi et al.

(10) Patent No.: US 12,641,215 B2
(45) Date of Patent: May 26, 2026

(54) STEREOSCOPIC DISPLAY DEVICE FOR MULTIPLE OBSERVERS

(71) Applicant: University Public Corporation Osaka, Osaka (JP)

(72) Inventors: Hideya Takahashi, Osaka (JP); Goro Hamagishi, Osaka (JP)

(73) Assignee: University Public Corporation Osaka (JP)

( * ) Notice: Subject to any disclaimer, the term of this patent is extended or adjusted under 35 U.S.C. 154(b) by 0 days.

(21) Appl. No.: 18/855,992

(22) PCT Filed: Mar. 31, 2023

(86) PCT No.: PCT/JP2023/013639
§ 371 (c)(1),
(2) Date: Oct. 10, 2024

(87) PCT Pub. No.: WO2023/199765
PCT Pub. Date: Oct. 19, 2023

(65) Prior Publication Data
US 2025/0193368 A1       Jun. 12, 2025

(30) Foreign Application Priority Data
Apr. 12, 2022     (JP) ................................. 2022-065831

(51) Int. Cl.
*H04N 13/368*          (2018.01)
*H04N 13/31*           (2018.01)
(Continued)

(52) U.S. Cl.
CPC .......... *H04N 13/368* (2018.05); *H04N 13/31* (2018.05); *H04N 13/317* (2018.05); *H04N 13/327* (2018.05); *H04N 13/398* (2018.05)

(58) Field of Classification Search
None
See application file for complete search history.

(56) References Cited

U.S. PATENT DOCUMENTS

2013/0181895 A1*   7/2013   Kim .......................... G09G 3/34
                                                                345/156
2014/0152556 A1*   6/2014   Ohbitsu ................. G02B 30/27
                                                                345/156
(Continued)

FOREIGN PATENT DOCUMENTS

JP          2011-077679 A        4/2011
JP          2017-038367 A        2/2017
(Continued)

OTHER PUBLICATIONS

International Search Report for International Application No. PCT/JP2023/013639 dated Jun. 20, 2023, 4 pages.

*Primary Examiner* — Edemio Navas, Jr.
(74) *Attorney, Agent, or Firm* — Thorpe North & Western, LLP

(57) ABSTRACT

A stereoscopic display device includes an optical element configured to restrict a $(2h-1)^{th}$ image for a right eye of an $h^{th}$ (h: a natural number) observer and a $2h^{th}$ image for a left eye of the $h^{th}$ observer to a position where visual recognition is possible and a display having a display surface including a plurality of pixels arranged in a first direction and a second direction and configured to display the $(2h-1)^{th}$ image and the $2h^{th}$ image. A control process is performed so that at least one of a $(2h-1)^{th}$ viewpoint region where the $(2h-1)^{th}$ image is visually recognizable and a $2h^{th}$ viewpoint region where the $2h^{th}$ image is visually recognizable is wider than a distance between the eyes of the observer, the $(2h-1)^{th}$ image is displayed on $(n_{(2h-1)})$ pixels, the $2h^{th}$ image is displayed on $(n_{(2h)})$ pixels, and a position of at least one of a $(2h-1)^{th}$ interocular boundary that is a boundary between the right eye and the left eye of the $h^{th}$ observer and a $(2h-1)^{th}$ interobserver boundary that is a boundary between the $h^{th}$ observer and an $(h+1)^{th}$ observer is moved on the (Continued)

basis of position data indicating positions of the eyes of the $h^{th}$ observer.

16 Claims, 8 Drawing Sheets

(51) Int. Cl.
_H04N 13/317_ (2018.01)
_H04N 13/327_ (2018.01)
_H04N 13/398_ (2018.01)

(56) References Cited

U.S. PATENT DOCUMENTS

| | | | |
|---|---|---|---|
| 2015/0029317 A1* | 1/2015 | Kim | H04N 13/383 |
| | | | 348/59 |
| 2016/0080729 A1* | 3/2016 | Watanabe | H04N 13/225 |
| | | | 348/54 |
| 2016/0142704 A1* | 5/2016 | Hamagishi | H04N 13/351 |
| | | | 348/59 |
| 2017/0041596 A1 | 2/2017 | Park et al. | |

FOREIGN PATENT DOCUMENTS

| | | |
|---|---|---|
| WO | WO 2015/132828 A1 | 9/2015 |
| WO | WO 2020/130049 A1 | 6/2020 |

* cited by examiner

*FIG. 2*

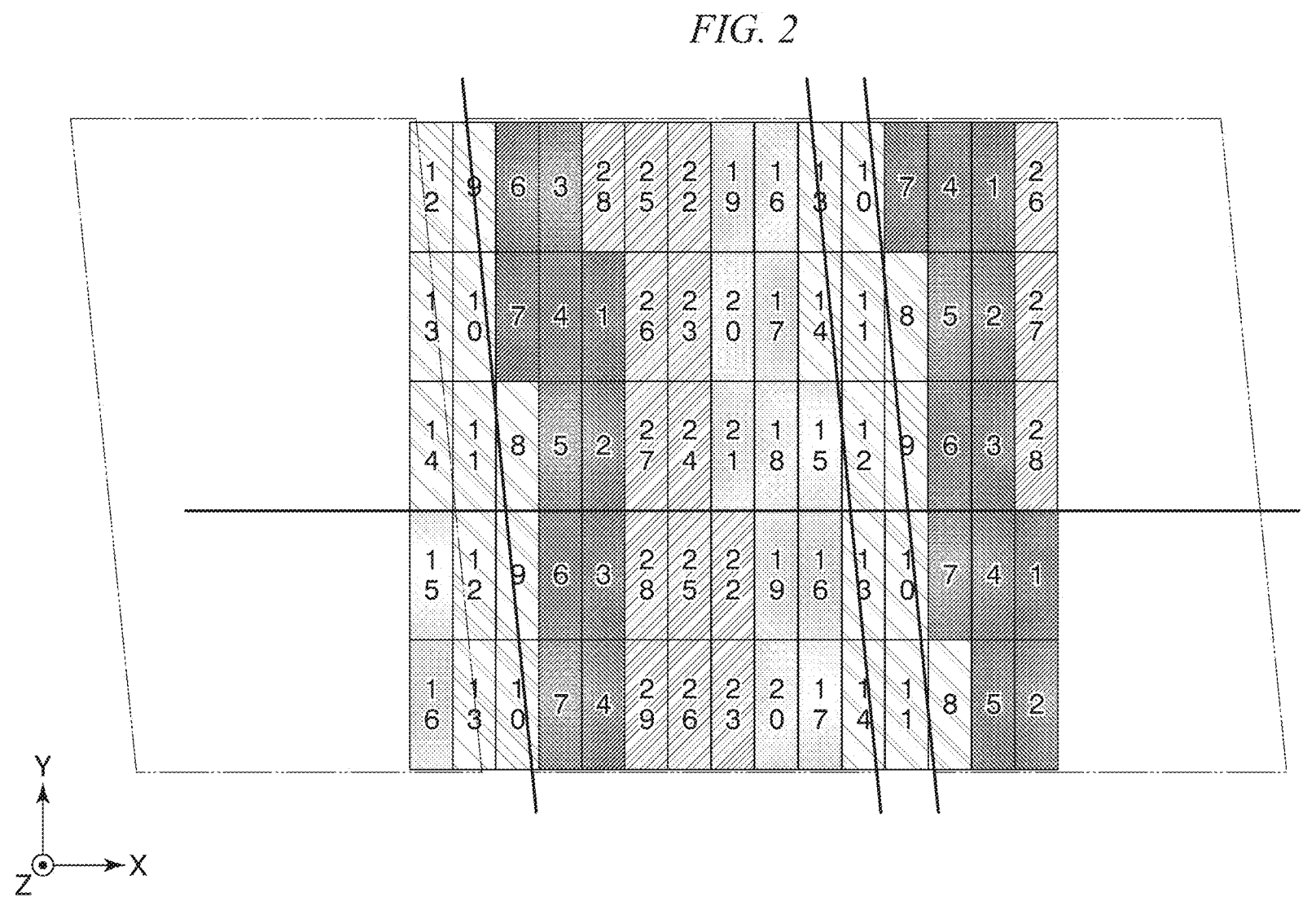

| 26 | 27 | 28 | 1 | 2 |
|----|----|----|----|----|
| 1 | 2 | 3 | 4 | 5 |
| 4 | 5 | 6 | 7 | 8 |
| 7 | 8 | 9 | 10 | 11 |
| 10 | 11 | 12 | 13 | 14 |
| 13 | 14 | 15 | 16 | 17 |
| 16 | 17 | 18 | 19 | 20 |
| 19 | 20 | 21 | 22 | 23 |
| 22 | 23 | 24 | 25 | 26 |
| 25 | 26 | 27 | 28 | 29 |
| 28 | 1 | 2 | 3 | 4 |
| 3 | 4 | 5 | 6 | 7 |
| 6 | 7 | 8 | 9 | 10 |
| 9 | 10 | 11 | 12 | 13 |
| 12 | 13 | 14 | 15 | 16 |

STEREOSCOPIC DISPLAY DEVICE FOR MULTIPLE OBSERVERS

TECHNICAL FIELD

The disclosure relates to a stereoscopic display device.

BACKGROUND ART

Research and development of a display for allowing observers to visually recognize a stereoscopic image without the conventional use of stereoscopic glasses, stereoscopic goggles, and the like has been underway. Examples of such a display include, for example, a stereoscopic image display device disclosed in Patent Document 1.

CITATION LIST

Patent Document

Patent Document 1: Japanese Unexamined Patent Application, First Publication No. 2011-077679

The above-described stereoscopic image display device analyzes resolution of data for a left eye and data for a right eye in a horizontal direction and determines whether or not the resolution is fine at a predetermined level or higher. When the resolution is fine at the predetermined level or higher, because an influence on the deterioration in image quality is large due to lowered resolution of the left eye data and the right eye data, the stereoscopic image display device aggregates data for the left eye and data for the right eye at a single location and performs a high-resolution display process in which a stereoscopic image can be browsed at a single location. On the other hand, when the resolution is not fine at the predetermined level or higher, because an influence on the deterioration in image quality is small due to lowered resolution of the left eye data and the right eye data, the stereoscopic image display device performs a multi-viewpoint display process in which the data for the left eye and the data for the right eye are aggregated at a plurality of locations, enables stereopsis at a plurality of locations, and improves browsability. The above-described stereoscopic image display device can provide a stereoscopic image having high browsability either when the resolution is fine at the predetermined level or higher or when the resolution is not fine at the predetermined level or higher.

However, the above-described stereoscopic image display device does not allow a plurality of observers to simultaneously visually recognize a stereoscopic image. Moreover, because the above-described stereoscopic image display device aggregates the data for the right eye and the data for the left eye at a specific location, when the observer moves, the observer may not be able to visually recognize the stereoscopic image. On the other hand, research and development is currently underway on the assumption that this will be used for surgical operations and the like using a telemedicine technique and it is desirable to develop a technique for allowing a plurality of observers who are likely to move to simultaneously visually recognize a stereoscopic image.

SUMMARY OF INVENTION

Technical Problem

The disclosure has been made in view of the above-described problems and an objective of the disclosure is to provide a stereoscopic display device capable of allowing at least one observer who is likely to move to simultaneously visually recognize a stereoscopic image.

Solution to Problem

According to an aspect of the disclosure, there is provided a stereoscopic display device capable of being visually recognized by a plurality of observers, the stereoscopic display device including: an optical element configured to restrict a $(2h-1)^{th}$ image visually recognized by a right eye of an $h^{th}$ (h: a natural number) observer and a $2h^{th}$ image visually recognized by a left eye of the $h^{th}$ observer to a position where visual recognition of the $h^{th}$ observer is possible; a display having a display surface including a plurality of pixels arranged in a first direction and a second direction intersecting the first direction and configured to display the $(2h-1)^{th}$ image and the $2h^{th}$ image on the display surface; and a display control portion configured to control the display so that at least one of a $(2h-1)^{th}$ viewpoint region where the $(2h-1)^{th}$ image is visually recognizable and a $2h^{th}$ viewpoint region where the $2h^{th}$ image is visually recognizable is wider than a distance between the right eye and the left eye of the $h^{th}$ observer, the $(2h-1)^{th}$ image is displayed on $(n_{(2h-1)})$ consecutive pixels and the $2h^{th}$ image is displayed on $(n_{(2h)})$ consecutive pixels in accordance with an angle of the optical element based on the second direction, and a position of at least one of a $(2h-1)^{th}$ interocular boundary that is a boundary between the right eye and the left eye of the $h^{th}$ observer and a $(2h-1)^{th}$ interobserver boundary that is a boundary between the $h^{th}$ observer and an $(h+1)^{th}$ observer is moved on the basis of position data indicating positions of the eyes of the $h^{th}$ observer.

According to an aspect of the disclosure, there is provided a stereoscopic display device including: an optical element configured to restrict a position where each of a first right-eye image visually recognized by a right eye of a first observer, a first left-eye image visually recognized by a left eye of the first observer, a second right-eye image visually recognized by a right eye of a second observer, and a second left-eye image visually recognized by a left eye of the second observer is visually recognizable; a display having a display surface including a plurality of pixels arranged in a first direction and a second direction intersecting the first direction and configured to display the first right-eye image, the first left-eye image, the second right-eye image, and the second left-eye image on the display surface; and a display control portion configured to control the display so that at least one of a first right-eye viewpoint region where the first right-eye image is visually recognizable and a first left-eye viewpoint region where the first left-eye image is visually recognizable is wider than a distance between the right eye and the left eye of the first observer, at least one of a second right-eye viewpoint region where the second right-eye image is visually recognizable and a second left-eye viewpoint region where the second left-eye image is visually recognizable is wider than a distance between the right eye and the left eye of the second observer, the first right-eye image is displayed on n (n: a natural number) consecutive pixels in accordance with an angle of the optical element based on the second direction, the first left-eye image is displayed on m (m: a natural number) consecutive pixels, the second right-eye image is displayed on k (k: a natural number) consecutive pixels, the second left-eye image is displayed on p (p: a natural number) consecutive pixels, and a position of at least one of a boundary between the first right-eye image and the first left-eye image, a boundary between the first left-eye image and the second right-eye image, a boundary between the first right-eye image and the second left-eye image, and a boundary between the second right-eye image and the second left-eye image is moved on the basis of first position data indicating positions of the eyes of the first observer and second position data indicating positions of the eyes of the second observer.

According to an aspect of the disclosure, there is provided a stereoscopic display device including: an optical element configured to restrict a position where each of parallax images observed in correspondence with eyes of a plurality of observers is visually recognizable; a display having a display surface including a plurality of pixels arranged in a first direction and a second direction intersecting the first direction and configured to display the parallax images on the display surface; and a display control portion configured to perform a control process so that a width of a viewpoint region where the parallax image is visually recognizable is wider than at least a distance between a right eye and a left eye of each observer, each parallax image is displayed on q (q: a natural number of 4 or more) consecutive pixels in accordance with an angle of the optical element based on the second direction, and the width of the viewpoint region of the parallax image is changed in correspondence with position information of each observer.

Advantageous Effects of Invention

According to the disclosure, it is possible to provide a stereoscopic display device capable of allowing at least two observers who are likely to move to simultaneously visually recognize a stereoscopic image.

BRIEF DESCRIPTION OF DRAWINGS

FIG. 2 A diagram showing an example of an image displayed on a display in a case shown in FIG. 1.

4

Figure 10:
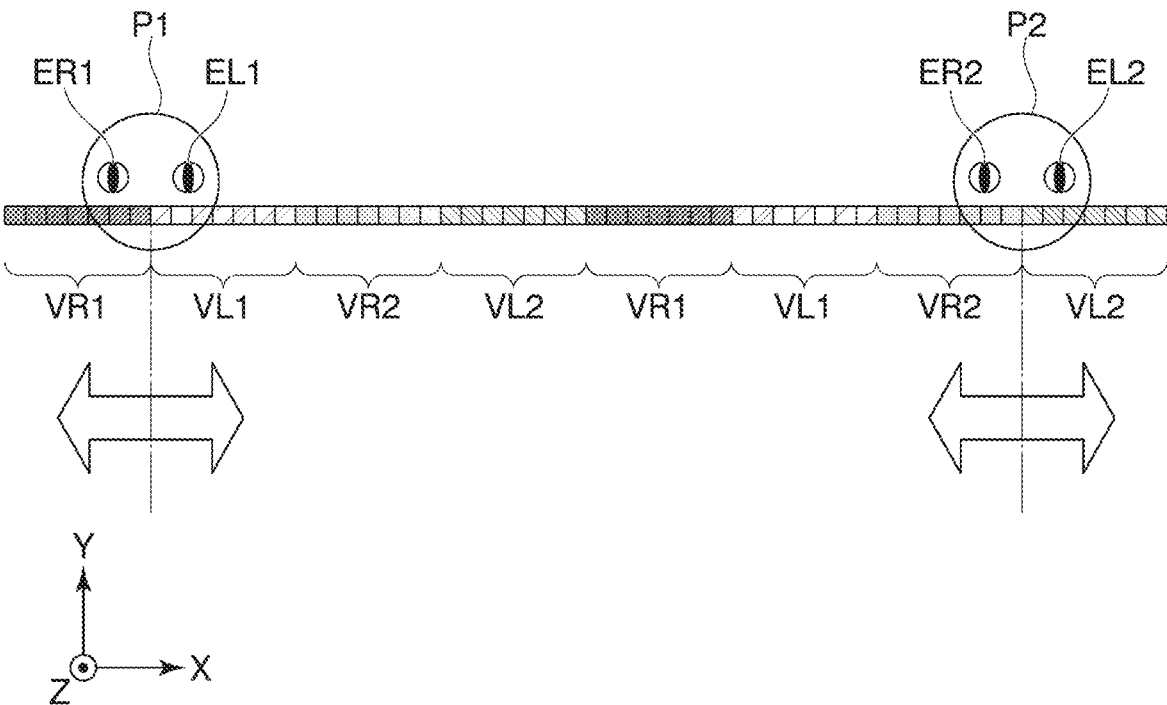

FIG. 10 A diagram showing an example of positional relationships of a first observer, a first right-eye viewpoint region, a second observer, a second right-eye viewpoint region, and a second left-eye viewpoint region according to a third embodiment.

DESCRIPTION OF EMBODIMENTS

First Embodiment

A display device according to a first embodiment will be described with reference to FIGS. 1 to 8.

Figure 1:
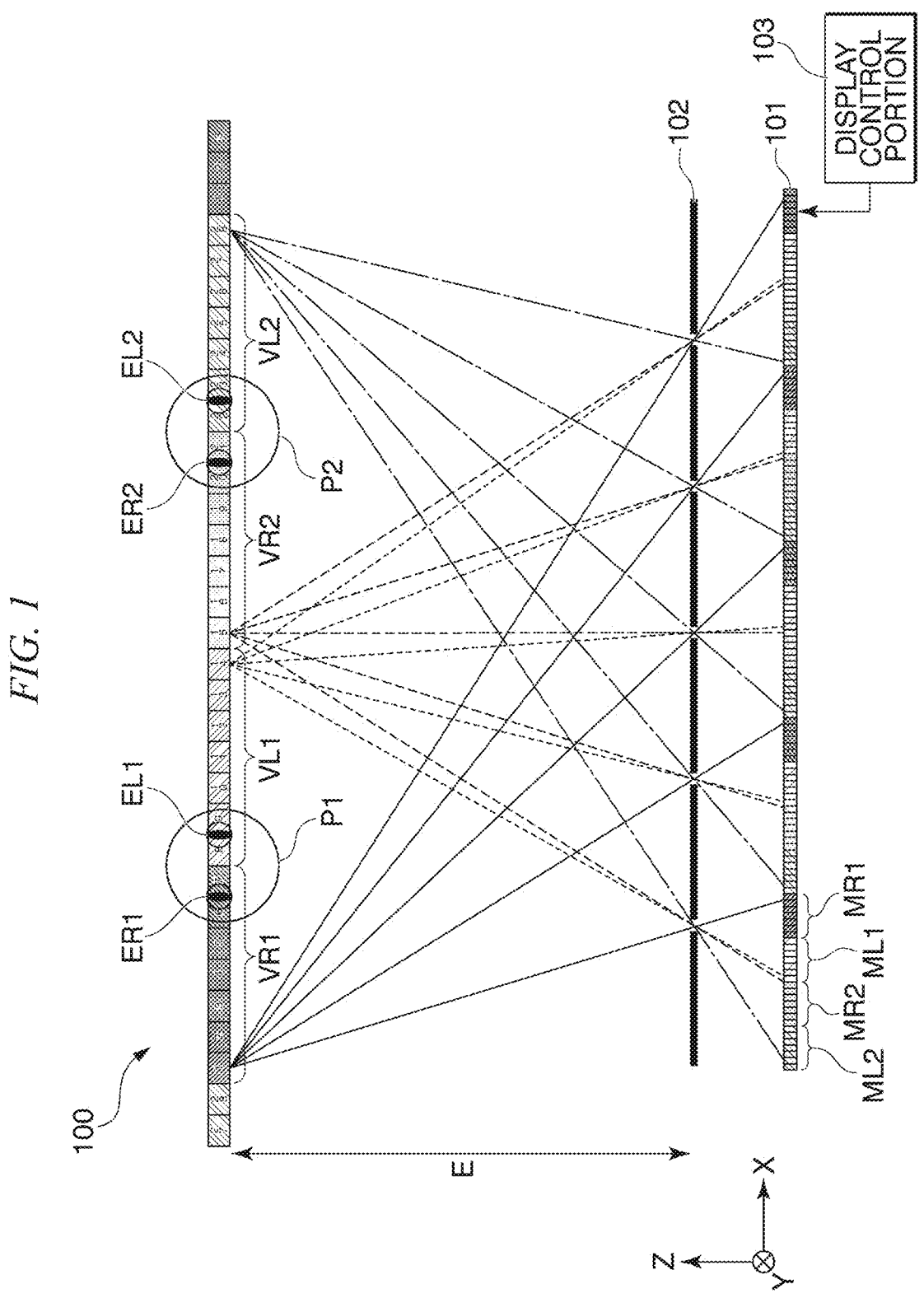
FIG. 1 A diagram showing an example of a stereoscopic display device according to a first embodiment.

FIG. 1 is a diagram showing an example of a stereoscopic display device according to the first embodiment. As shown in FIG. 1, a stereoscopic display device 100 includes a display 101, an optical element 102, and a display control portion 103. In the following description, three-dimensional Cartesian coordinates defined by an X-axis, a Y-axis, and a Z-axis shown in FIG. 1 are used appropriately. The X-axis, the Y-axis, and the Z-axis form a right-handed system.

The display 101 has a display surface including a plurality of pixels arranged in first and second directions. The first direction is, for example, an X-direction shown in FIG. 1. The second direction is a direction intersecting the first direction, for example, a Y-direction shown in FIG. 1. The display surface is parallel to an XY plane and displays a first right-eye image MR1, a first left-eye image ML1, a second right-eye image MR2, and a second left-eye image ML2 on a plane perpendicular to the Z-axis. The first right-eye image MR1 is an image visually recognized by a right eye of a first observer P1. The first left-eye image ML1 is an image visually recognized by a left eye of the first observer P1. The second right-eye image MR2 is an image visually recognized by the right eye of the second observer P2. The second left-eye image ML2 is an image visually recognized by the left eye of the second observer P2.

The optical element 102 is, for example, a parallax barrier having a linear slit tilted at a predetermined angle with respect to the X-axis and the Y-axis. The optical element 102 restricts a position where the first right-eye image MR1, the first left-eye image ML1, the second right-eye image MR2, and the second left-eye image ML2 are visually recognizable. Moreover, as shown in FIG. 1, it is necessary to perform observation from a position at the optimal observation distance E so that a right eye ER1 and a left eye EL1 of the first observer P1 and a right eye ER2 and a left eye EL2 of the second observer P2 observe normal stereopsis on the entire screen.

The display control portion 103 controls the display 101 so that at least one of the first right-eye viewpoint region VR1 and the first left-eye viewpoint region VL1 is wider than the distance between the right eye and the left eye of the first observer P1.

The first right-eye viewpoint region VR1 is a region where the first right-eye image MR1 is visually recognizable. In FIG. 1, the first right-eye viewpoint region VR1 includes a unit region to which the number "1" is assigned, a unit region to which the number "2" is assigned, . . . , and a unit region to which the number "7" is assigned. Each of these unit regions corresponds to n (n: a natural number) consecutive pixels in accordance with the angle of the optical element based on the second direction. In this case, n=7. As shown in FIG. 1, the right eye ER1 of the first observer P1 is located in the first right-eye viewpoint region VR1 when the first observer P1 visually recognizes a stereoscopic image.

The first left-eye viewpoint region VL1 is a region where the first left-eye image ML1 is visually recognizable. In FIG. 1, the first right-eye viewpoint region VR1 includes a unit region to which the number "8" is assigned, and a unit region to which the number "9" is assigned, . . . , and a unit region to which the number "14" is assigned. Each of these unit regions corresponds to m (m: a natural number) consecutive pixels in accordance with the angle of the optical element based on the second direction. In this case, m=7. As shown in FIG. 1, the left eye EL1 of the first observer P1 is located in the first left-eye viewpoint region VL1 when the first observer P1 visually recognizes a stereoscopic image.

Moreover, the display control portion 103 controls the display 101 so that at least one of the second right-eye viewpoint region VR2 and the second left-eye viewpoint region VL2 is wider than the distance between the right eye and the left eye of the second observer P2.

The second right-eye viewpoint region VR2 is a region where the second right-eye image MR2 is visually recognizable. In FIG. 1, the second right-eye viewpoint region VR2 includes a unit region to which the number "15" is assigned, a unit region to which the number "16" is assigned, . . . , and a unit region to which the number "21" is assigned. Each of these unit regions correspond to k (k: a natural number) consecutive pixels in accordance with the angle of the optical element based on the second direction. In this case, k=7. As shown in FIG. 1, the right eye ER2 of the second observer P2 is located in the second right-eye viewpoint region VR2 when the second observer P2 visually recognizes a stereoscopic image.

The second left-eye viewpoint region VL2 is a region where the second left-eye image ML2 is visually recognizable. In FIG. 1, the second left-eye viewpoint region VL2 includes a unit region to which the number "22" is assigned, a unit region to which the number "23" is assigned, . . . , and a unit region to which the number "28" is assigned. Each of these unit regions correspond to p (p: a natural number) consecutive pixels in accordance with the angle of the optical element based on the second direction. In this case, p=7. As shown in FIG. 1, the left eye EL2 of the second observer P2 is located in the second left-eye viewpoint region VL2 when the second observer P2 visually recognizes a stereoscopic image.

For example, as shown in FIG. 1, the display control portion 103 controls the display 101 so that the first right-eye viewpoint region VR1 and the first left-eye viewpoint region VL1 are wider than a distance between the right eye and the left eye of the first observer P1. Moreover, for example, as shown in FIG. 1, the display control portion 103 controls the display 101 so that the second right-eye viewpoint region VR2 and the second left-eye viewpoint region VL2 are wider than a distance between the right eye and the left eye of the second observer P2.

FIG. 2 is a diagram showing an example of images displayed on the display in the case shown in FIG. 1. The display 101 displays the image shown in FIG. 2 when the first right-eye viewpoint region VR1, the first left-eye viewpoint region VL1, the second right-eye viewpoint region VR2, and the second left-eye viewpoint region VL2 are controlled as shown in FIG. 1. That is, the display control portion 103 controls the display 101 so that the first right-eye image is displayed on n (n: a natural number) consecutive pixels, the first left-eye image is displayed on m (m: a natural number) consecutive pixels, the second right-eye image is displayed on k (k: a natural number) consecutive pixels, and the second left-eye image is displayed on p (p: a natural number) consecutive pixels.

In this case, the display control portion 103 controls the display 101 so that a sum of the number of consecutive pixels n, the number of consecutive pixels m, the number of consecutive pixels k, and the number of consecutive pixels p remains uniform all the time. In this case, the display control portion 103 performs a control process so that at least two of the number of consecutive pixels n, the number of consecutive pixels m, the number of consecutive pixels k, and the number of consecutive pixels p are changed on the basis of the position of the first observer and the position of the second observer.

Moreover, the display control portion 103 executes these processes in accordance with the angle of the optical element based on the second direction. For example, the display control portion 103 executes these processes in accordance with an angle of a linear slit of the parallax barrier based on the Y-direction.

Further, the display control portion 103 controls the display 101 so that at least one position of a boundary between the first right-eye image MR1 and the first left-eye image ML1, a boundary between the first left-eye image ML1 and the second right-eye image MR2, a boundary between the first right-eye image MR1 and the second left-eye image ML2, and a boundary between the second right-eye image MR2 and the second left-eye image ML2 is moved. The display control portion 103 controls the display 101 so that at least one of the above-described four boundaries is moved on the basis of the first position data indicating the position of the eyes of the first observer P1 and the second position data indicating the position of the eyes of the second observer P2.

The first position data is generated by identifying the positions of the right eye ER1 and the left eye EL1 of the first observer P1, for example, on the basis of an image captured by a camera mounted on the display 101. A method of identifying the positions of the right eye ER1 and the left eye EL1 of the first observer P1 is not particularly limited. Likewise, the second position data is generated by identifying the positions of the right eye ER2 and the left eye EL2 of the second observer P2, for example, on the basis of the image captured by the camera mounted on the display 101. A method of identifying the positions of the right eye ER2 and the left eye EL2 of the second observer P2 is not particularly limited.

Figure 3:
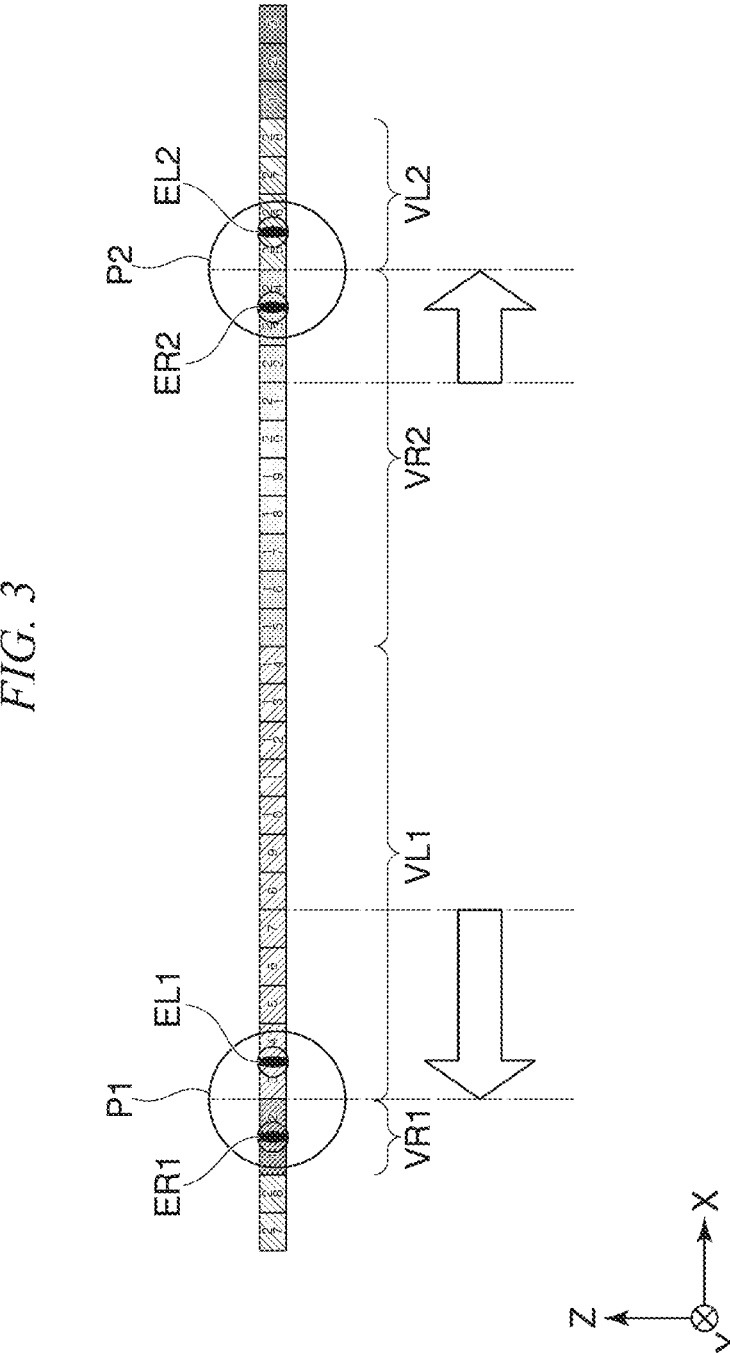
FIG. 3 A diagram showing an example of a first right-eye viewpoint region, a first left-eye viewpoint region, a second right-eye viewpoint region, and a second left-eye viewpoint region when a first observer and a second observer have moved according to the first embodiment.

FIG. 3 is a diagram showing an example of the first right-eye viewpoint region, the first left-eye viewpoint region, the second right-eye viewpoint region, and the second left-eye viewpoint region when the first observer and the second observer are moved according to the first embodiment. FIG. 3 shows an example in which the first observer P1 moves in a −X-direction from the position shown in FIG. 1 and the second observer P2 moves in a +X-direction from the position shown in FIG. 1.

In the case shown in FIG. 3, the display control portion 103 controls the display 101 so that the unit region to which the number "1" is assigned and the unit region to which the number "2" is assigned become the first right-eye viewpoint region VR1 and unit regions from the unit region to which the number "3" is assigned to the unit region to which the number "14" is assigned become the first left-eye viewpoint region VL1. Moreover, in the case shown in FIG. 3, the display control portion 103 controls the display 101 so that unit regions from the unit region to which the number "15" is assigned to the unit region to which the number "24" is assigned become the second right-eye viewpoint region VR2 and unit regions from the unit region where the number "25" is assigned to the unit region to which the number "28" is assigned become the second left-eye viewpoint region VL2.

Moreover, when the display 101 is controlled so that the viewpoint regions become the first right-eye viewpoint region VR1, the first left-eye viewpoint region VL1, the second right-eye viewpoint region VR2, and the second left-eye viewpoint region VL2 shown in FIG. 3, the display control portion 103 controls the display 101 so that a position of a boundary between these regions is moved.

Figure 4:
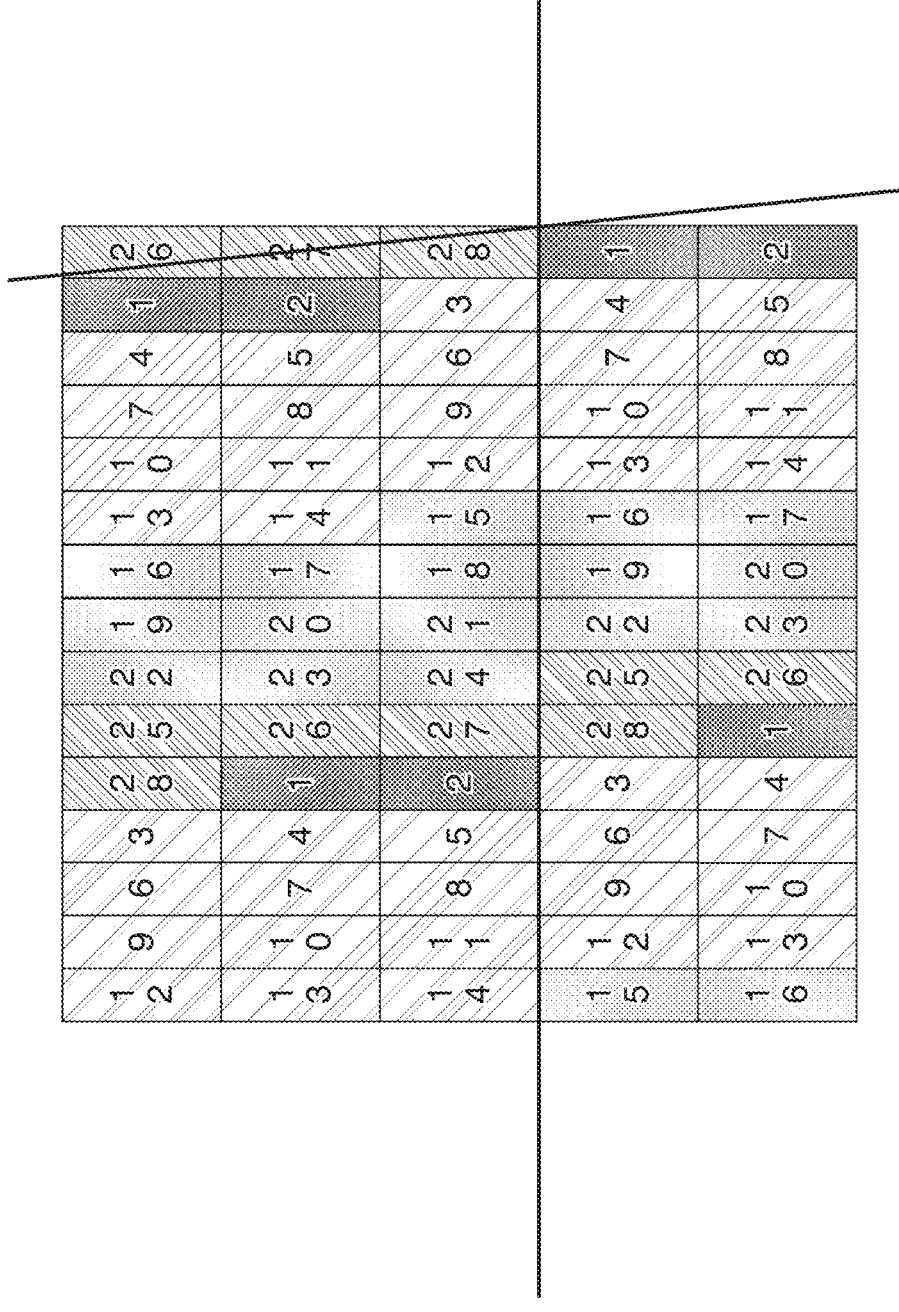
FIG. 4 A diagram showing an example of an image displayed on a display in a case shown in FIG. 3.
Figure 4:
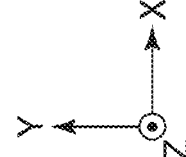

FIG. 4 is a diagram showing an example of an image displayed on a display in the case shown in FIG. 3. The display 101 displays the image shown in FIG. 4 when the first right-eye viewpoint region VR1, the first left-eye viewpoint region VL1, the second right-eye viewpoint region VR2, and the second left-eye viewpoint region VL2 are controlled as shown in FIG. 3. That is, the display control portion 103 controls the display 101 so that the first right-eye image is displayed on n consecutive pixels, the first left-eye image is displayed on m consecutive pixels, the second right-eye image is displayed on k consecutive pixels, and the second left-eye image is displayed on p consecutive pixels.

In this case, the display control portion 103 controls the display 101 so that a sum of the number of consecutive pixels n, the number of consecutive pixels m, the number of consecutive pixels k, and the number of consecutive pixels p remains uniform all the time. Moreover, in this case, the display control portion 103 performs a control process so that at least two of the number of consecutive pixels n, the number of consecutive pixels m, the number of consecutive pixels k, and the number of consecutive pixels p are changed on the basis of the position of the first observer and the position of the second observer.

Moreover, the display control portion 103 executes these processes in accordance with the angle of the optical element based on the second direction. For example, the display control portion 103 executes these processes in accordance with an angle of the linear slit of the parallax barrier based on the Y-direction.

Moreover, when the relative speed between the eyes of the first observer P1 and the eyes of the second observer P2 is zero, the display control portion 103 controls the display 101 so that the above-described four boundaries are moved at a speed equal to a speed at which the eyes of the first observer P1 move and a speed at which the eyes of the second observer P2 move.

Alternatively, when the relative speed between the eyes of the first observer P1 and the eyes of the second observer P2 is not zero, the display control portion 103 controls the display 101 so that the boundary between the first right-eye image MR1 and the first left-eye image ML1 is moved on the basis of the first position data in a range wider than a distance that is twice the distance between the right eye and the left eye of the first observer P1. Moreover, when the relative speed between the eyes of the first observer P1 and the eyes of the second observer P2 is not zero, the display control portion 103 controls the display 101 so that the boundary between the second right-eye image MR2 and the second left-eye image ML2 is moved on the basis of the second position data in a range wider than a distance that is twice the distance between the right eye and the left eye of the second observer P2.

Further, if it is not possible for the first observer P1 and the second observer P2 to visually recognize the stereoscopic image in at least one of these two control processes, the display control portion 103 may execute the following process. The display control portion 103 may control the display 101 so that at least one of the boundary between the first left-eye image ML1 and the second right-eye image MR2 and the boundary between the first right-eye image MR1 and the second left-eye image ML2 is moved on the basis of the first position data and the second position data. Moreover, these boundaries are moved in a range in which the first observer P1 is able to visually recognize the first right-eye image MR1 and the first left-eye image ML1 and the second observer P2 is able to visually recognize the second right-eye image MR2 and the second left-eye image ML2.

Moreover, when it is necessary to preferentially provide stereopsis to the first observer P1 over the second observer P2 and the second observer P2 has entered a predetermined range from a range in which the second observer P2 is able to visually recognize the first right-eye image MR1, the display control portion 103 may control the display 101 so that an aspect of at least a part of the second left-eye image ML2 is changed. Examples of a process of changing the aspect in this way include a process of changing the luminance of at least a part of the second left-eye image ML2, a process of displaying a predetermined mark on a part of the second left-eye image ML2, and a process of displaying text such as "warning" on a part of the second left-eye image ML2.

Moreover, when it is necessary to preferentially provide stereopsis to the first observer P1 over the second observer P2 and the relative speed between the eyes of the first observer P1 and the eyes of the second observer P2 is not zero, the display control portion 103 may execute the following process. In this case, the display control portion 103 controls the display 101 so that at least one of the boundary between the first left-eye image ML1 and the second right-eye image MR2 and the boundary between the first right-eye image MR1 and the second left-eye image ML2 is moved on the basis of the first position data and the second position data. Moreover, these boundaries are moved in the range in which the first observer P1 is able to visually recognize the first right-eye image MR1 and the first left-eye image ML1.

Figure 5:
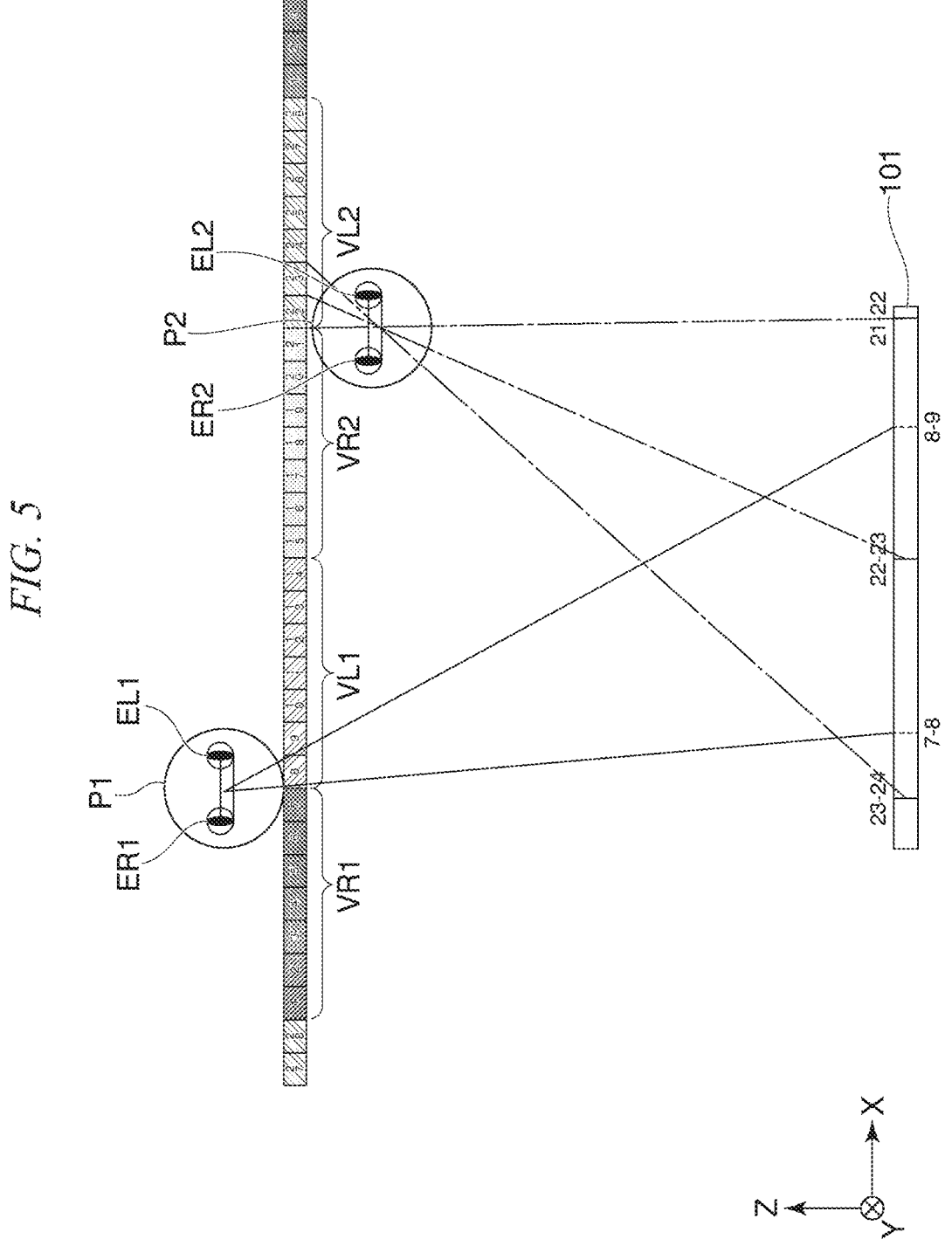
FIG. 5 A diagram showing an example of a boundary between a first right-eye image and a first left-eye image and a boundary between the second right-eye image and a second left-eye image when the first observer moves in a +Z-direction from an optimal observation distance and the second observer moves in a −Z-direction from the optimal observation distance according to the first embodiment.
Figure 6:
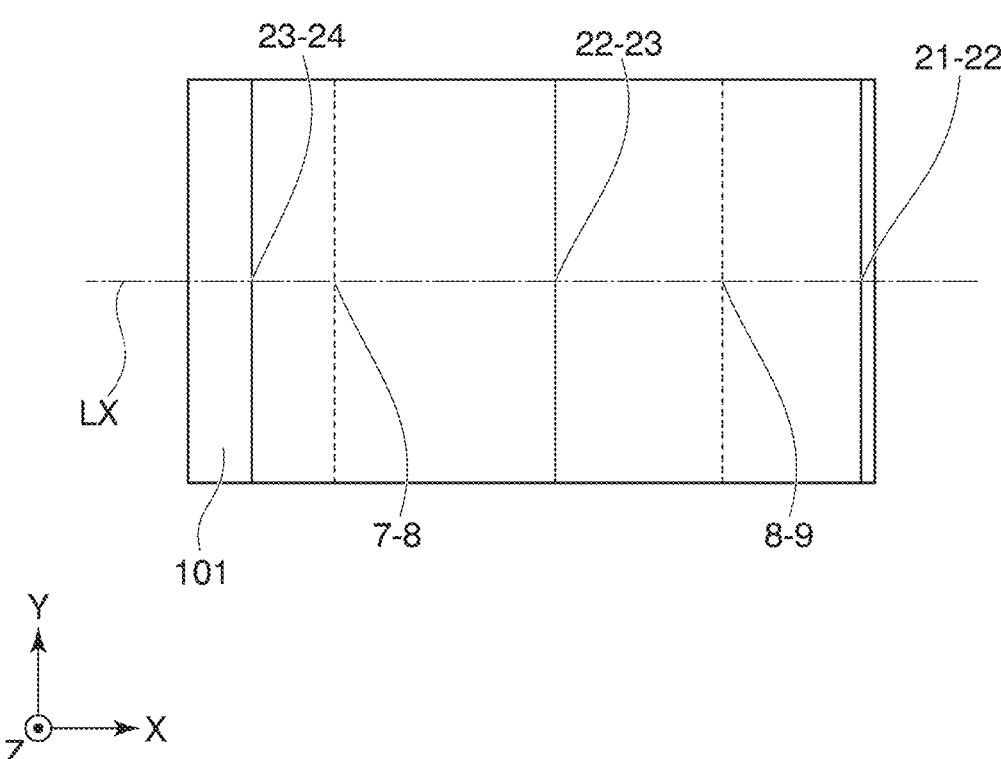
FIG. 6 A diagram showing an example of points identified by the stereoscopic display device according to the first embodiment.

FIG. 5 is a diagram showing an example of the boundary between the first right-eye image and the first left-eye image and the boundary between the second right-eye image and the second left-eye image when the first observer moves in the +Z-direction from an optimal observation distance and the second observer moves in the −Z-direction from the optimal observation distance according to the first embodiment. FIG. 6 is a diagram showing an example of a point identified by the stereoscopic display device according to the first embodiment. Moreover, a dashed single-dot line LX shown in FIG. 6 is a center line of the display 101 in the Y-direction.

When the first observer is closer to the display 101 than a position at an optimal observation distance E or when the first observer P1 is farther from the display 101 than the position at the optimal observation distance E, the display control portion 103 identifies a reference point at which a straight line passing through the point between the right eye ER1 and the left eye EL1 of the first observer P1 and the boundary between the first right-eye viewpoint region VR1 and the first left-eye viewpoint region VL1 intersects the display 101. Moreover, when the first observer P1 is closer to the display 101 than the position at the optimal observation distance E or when the first observer P1 is farther from the display 101 than the position at the optimal observation distance E, the display control portion 103 identifies a reference point at which a straight line passing through the point between the right eye ER1 and the left eye EL1 of the first observer P1 and the boundary between unit regions constituting the first right-eye viewpoint region VR1 or the boundary between unit regions constituting the first left-eye viewpoint region VL1 intersects the display 101.

For example, the display control portion 103 identifies a midpoint between the right eye ER1 and the left eye EL1 of the first observer P1 on the basis of the first position data. Subsequently, the display control portion 103 identifies a straight line passing through a boundary between the unit region to which the number "7" is assigned in FIG. 5 and the unit region to which the number "8" is assigned in FIG. 5 and the midpoint. Also, the display control portion 103 identifies an intersection between the midpoint and the display 101 and designates the intersection as a reference point "7-8" as shown in FIGS. 5 and 6.

Moreover, for example, the display control portion 103 identifies a midpoint between the right eye ER1 and the left eye EL1 of the first observer P1 on the basis of the first position data. Subsequently, the display control portion 103 identifies a straight line passing through the boundary between the unit region to which the number "8" is assigned in FIG. 5 and the unit region to which the number "9" is assigned in FIG. 5 and the midpoint. Also, the display control portion 103 identifies an intersection between the midpoint and the display 101 and designates the intersection as a reference point "8-9" as shown in FIGS. 5 and 6.

When the second observer is closer to the display 101 than a position at an optimal observation distance E or when the second observer P2 is farther from the display 101 than the position at the optimal observation distance E, the display control portion 103 identifies a reference point at which a straight line passing through the point between the right eye ER2 and the left eye EL2 of the second observer P2 and the boundary between the second right-eye viewpoint region VR2 and the second left-eye viewpoint region VL2 intersects the display 101. Moreover, when the second observer P2 is closer to the display 101 than the position at the optimal observation distance E or when the second observer P2 is farther from the display 101 than the position at the optimal observation distance E, the display control portion 103 identifies a reference point at which a straight line passing through the point between the right eye ER2 and the left eye EL2 of the second observer P2 and the boundary between unit regions constituting the second right-eye viewpoint region VR2 or the boundary between unit regions constituting the second left-eye viewpoint region VL2 intersects the display 101.

For example, the display control portion 103 identifies the midpoint between the right eye ER2 and the left eye EL2 of the second observer P2 on the basis of the second position data. Subsequently, the display control portion 103 identifies a straight line passing through the boundary between the unit region to which the number "21" is assigned in FIG. 5 and the unit region to which the number "22" is assigned in FIG. 5 and the midpoint. Also, the display control portion 103 identifies an intersection between the midpoint and the display 101 and designates the intersection as a reference point "21-22" as shown in FIGS. 5 and 6.

Moreover, for example, the display control portion 103 identifies the midpoint between the right eye ER2 and the left eye EL2 of the second observer P2 on the basis of the second position data. Subsequently, the display control portion 103 identifies a straight line passing through a boundary between the unit region to which the number "22" is assigned in FIG. 5 and the unit region to which the number "23" is assigned in FIG. 5, and the midpoint. Also, display control portion 103 identifies an intersection between the midpoint and the display 101 and designates the intersection as a reference point "22-23" as shown in FIGS. 5 and 6.

Moreover, for example, the display control portion 103 identifies the midpoint between the right eye ER2 and the left eye EL2 of the second observer P2 on the basis of the second position data. Subsequently, the display control portion 103 identifies a straight line passing through a boundary between the unit region to which the number "23" is assigned in FIG. 5 and the unit region to which the number "24" is assigned in FIG. 5 and the midpoint. Also, the display control portion 103 identifies an intersection between the midpoint and the display 101 and designates the intersection as a reference point "23-24" as shown in FIGS. 5 and 6.

The display control portion 103 controls the display 101 so that the display 101 displays the first right-eye image MR1 and the first left-eye image ML1 at a distance equal to a distance between two reference points adjacent to each other. Moreover, the display control portion 103 controls the display 101 so that the display 101 displays the second right-eye image MR2 and the second left-eye image ML2 at a distance equal to a distance between two reference points adjacent to each other.

Figure 7:
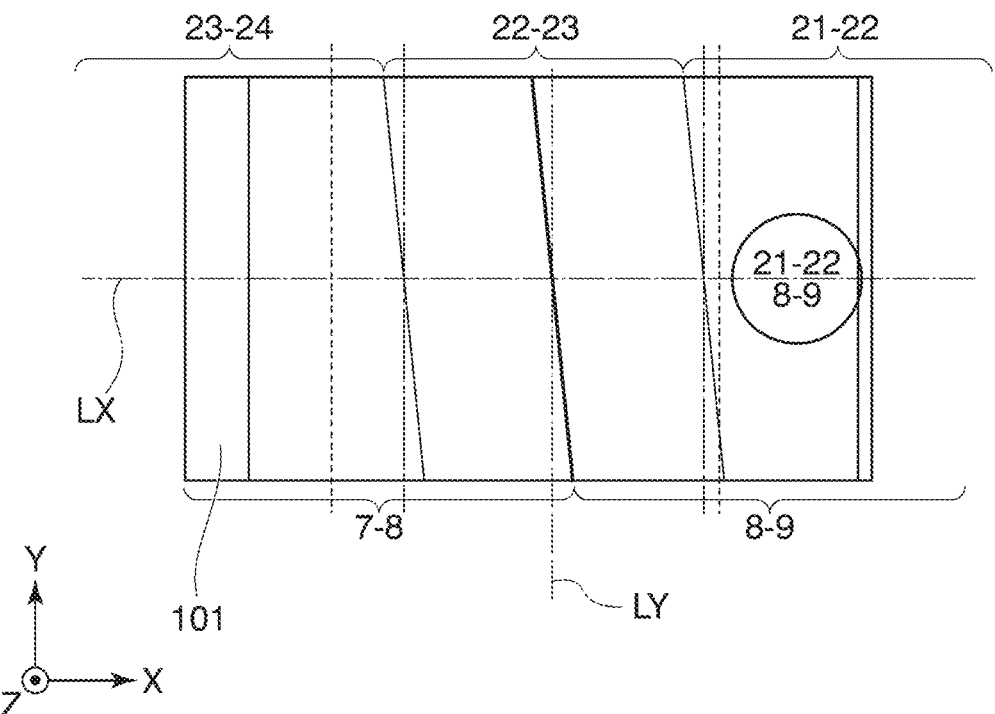
FIG. 7 A diagram showing an example of a boundary between a first right-eye image and a first left-eye image and a boundary between a second right-eye image and a second left-eye image shown in FIG. 5.

FIG. 7 is a diagram showing an example of the boundary between the first right-eye image and the first left-eye image and the boundary between the second right-eye image and the second left-eye image shown in FIG. 5. FIG. 7 is a diagram showing an example of points identified by the stereoscopic display device according to the first embodiment. A dashed single-dot line LX shown in FIG. 7 is a center line of the display 101 in the Y-direction. A dashed single-dot line LY shown in FIG. 7 is a center line of the display 101 in the X-direction.

For example, the display control portion 103 divides an image displayed on the display 101 at a distance equal to an interval between the reference point "7-8" and the reference point "8-9." At the centers of these images, the above-described reference points or a reference point identified on the basis of these reference points are located. These reference points are points through which the boundary between the first right-eye image MR1 and the first left-eye image ML1 passes. These boundaries are parallel to the slits provided in the optical element 102. Moreover, an example of these boundaries includes a boundary indicated by a thick solid line in FIG. 7.

Moreover, for example, the display control portion 103 divides the image displayed on the display 101 at a distance equal to the interval between the reference point "21-22" and the reference point "22-23" and the interval between the reference point "22-23" and the reference point "23-24." At the centers of these images, the above-described reference points or a reference point identified on the basis of these reference points are located. These reference points are points through which the boundary between the second right-eye image MR2 and the second left-eye image ML2 passes. In addition, these boundaries are parallel to the slits provided in the optical element 102. Moreover, as an example of these boundaries, a boundary indicated by a thin solid line in FIG. 7 is included.

Figure 8:
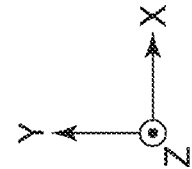
FIG. 8 A diagram showing an example of an image displayed on a display in cases shown in FIGS. 5 to 7.

FIG. 8 is a diagram showing an example of an image displayed on a display in the cases shown in FIGS. 5 to 7. The display 101 displays the image shown in FIG. 8 when the first right-eye viewpoint region VR1, the first left-eye viewpoint region VL1, the second right-eye viewpoint region VR2, and the second left-eye viewpoint region VL2 are controlled as shown in FIG. 7. That is, the display control portion 103 controls the display 101 so that the first right-eye image is displayed on n consecutive pixels, the first left-eye image is displayed on m consecutive pixels, the second right-eye image is displayed on k consecutive pixels, and the second left-eye image is displayed on p consecutive pixels.

In this case, the display control portion 103 controls the display 101 so that a sum of the number of consecutive pixels n, the number of consecutive pixels m, the number of consecutive pixels k, and the number of consecutive pixels p remains uniform all the time. Moreover, in this case, the display control portion 103 performs a control process so that at least two of the number of consecutive pixels n, the number of consecutive pixels m, the number of consecutive pixels k, and the number of consecutive pixels p are changed on the basis of the position of the first observer and the position of the second observer. For example, in this case, the display control portion 103 may cause the number of images of these four types to change unevenly due to a change in the distance between the first observer P1 and the second observer P2. Moreover, the display control portion 103 executes these processes in accordance with the angle of the optical element based on the second direction. For example, the display control portion 103 executes these processes in accordance with the angle of the linear slit of the parallax barrier based on the Y-direction.

In addition, the display control portion 103, for example, is implemented when a display control program stored in a storage medium is read and executed by a central processing unit (CPU) or the like. Alternatively, the display control portion 103 may be implemented by hardware including a circuit portion (circuitry) such as a large-scale integration (LSI) circuit, an application-specific integrated circuit (ASIC), a field-programmable gate array (FPGA), or a graphics processing unit (GPU). Alternatively, the display control portion 103 may be implemented by software and hardware in cooperation. Moreover, the hardware may be integrated into one or may be divided into a plurality of parts.

The stereoscopic display device 100 according to the first embodiment has been described above. The stereoscopic display device 100 includes the display 101, the optical element 102, and the display control portion 103. The display 101 includes a display surface including a plurality of pixels arranged in the first and second directions and displays the first right-eye image MR1, the first left-eye image ML1, the second right-eye image MR2, and the second left-eye image ML2. The optical element 102 restricts a position at which the first right-eye image MR1, the first left-eye image ML1, the second right-eye image MR2, and the second left-eye image ML2 are visually recognizable.

The display control portion 103 controls the display 101 so that at least one of the first right-eye viewpoint region VR1 and the first left-eye viewpoint region VL1 is wider than the distance between the right eye and the left eye of the first observer P1. Moreover, the display control portion 103 controls the display 101 so that at least one of the second right-eye viewpoint region VR2 and the second left-eye viewpoint region VL2 is wider than the distance between the right eye and the left eye of the second observer P2.

Further, the display control portion 103 controls the display 101 so that a sum of the number of consecutive pixels n, the number of consecutive pixels m, the number of consecutive pixels k, and the number of consecutive pixels p remains uniform all the time and at least two of the number of consecutive pixels n, the number of consecutive pixels m, the number of consecutive pixels k, and the number of consecutive pixels p are changed on the basis of the position of the first observer P1 and the position of the second observer P2.

Here, the display control portion 103 controls the display 101 so that each of (n+m) and (k+p) remains uniform in accordance with a boundary position between the first left-eye image ML1 and the second right-eye image MR.

For example, the value of n increases and the value of m decreases, such that the boundary position between the first right-eye image MR1 and the first left-eye image ML1 is changed. Moreover, the value of k decreases and the value of p increases, such that the boundary position between the second right-eye image MR2 and the second left-eye image ML2 is changed.

In this case, the display control portion 103 controls the display 101 so that each of (n+m) and (k+p) remains uniform. This control process is performed in this way so that the boundary position between the first right-eye image MR1 and the first left-eye image ML1 and the boundary position between the second right-eye image MR2 and the second left-eye image ML2 can be changed independently without changing the boundary position between the first left-eye image ML1 and the second right-eye image MR.

Moreover, because the display control portion 103 controls the display 101 so that each of (n+m) and (k+p) remains uniform in accordance with the boundary position between the first left-eye image ML1 and the first right-eye image MR1, each of the boundary position between the first right-eye image MR1 and the first left-eye image ML1 and the boundary position between the second right-eye image MR2 and the second left-eye image ML2 can be independently changed even if the boundary position between the first left-eye image ML1 and the second right-eye image MR is changed.

That is, the display control portion 103 can allow the first observer P1 and the second observer P2 to individually track the boundary position.

Moreover, the display control portion 103 controls the display 101 so that a position of at least one of the four boundaries is moved on the basis of the first position data indicating the positions of the eyes of the first observer P1 and the second position data indicating the positions of the eyes of the second observer P2. The four boundaries mentioned here are the boundary between the first right-eye image MR1 and the first left-eye image ML1, the boundary between the first left-eye image ML1 and the second right-eye image MR2, the boundary between the first right-eye image MR1 and the second left-eye image ML2, and the boundary between the second right-eye image MR2 and the second left-eye image ML2.

Thereby, even if at least one of the first observer P1 and the second observer P2 is moved, the stereoscopic display device 100 can change a position where at least one of the first right-eye image MR1, the first left-eye image ML1, the second right-eye image MR2, and the second left-eye image ML2 is displayed and allow the first observer P1 and the second observer P2 to simultaneously visually recognize the stereoscopic image.

Moreover, when the relative speed between the eyes of the first observer P1 and the eyes of the second observer P2 is not zero, the stereoscopic display device 100 controls the display 101 so that the boundary between the first right-eye image MR1 and the first left-eye image ML1 is moved on the basis of the first position data in a range wider than a distance that is twice the distance between the right eye and the left eye of the first observer P1. Moreover, when the relative speed between the eyes of the first observer P1 and the eyes of the second observer P2 is not zero, the stereo-scopic display device 100 controls the display 101 so that the boundary between the second right-eye image MR2 and the second left-eye image ML2 is moved on the basis of the second position data in a range wider than a distance that is twice the distance between the right eye and the left eye of the second observer P2.

Thereby, the stereoscopic display device 100 can provide room for the first observer P1 to move a distance obtained by subtracting a distance, which is twice the distance between the right eye and the left eye of the first observer P1, from a width of a region where the first right-eye viewpoint region VR1 and the first left-eye viewpoint region VL1 are combined. Moreover, thereby, the stereoscopic display device 100 can provide room for the second observer P2 to move a distance obtained by subtracting a distance, which is twice the distance between the right eye and the left eye of the second observer P2, from a width of a region where the second right-eye viewpoint region VR2 and the second left-eye viewpoint region VL2 are combined.

When the relative speed between the eyes of the first observer P1 and the eyes of the second observer P2 is not zero, the display control portion 103 controls the display 101 so that at least one of the boundary between the first left-eye image ML1 and the second right-eye image MR2 and the boundary between the first right-eye image MR1 and the second left-eye image ML2 is moved on the basis of the first position data and the second position data. These boundaries are moved in a range in which the first observer P1 can visually recognize the first right-eye image MR1 and the first left-eye image ML1 and the second observer P2 can visually recognize the second right-eye image MR2 and the second left-eye image ML2.

Thereby, the stereoscopic display device 100 can cause the first observer P1 and the second observer P2 to simul-taneously visualize a stereoscopic image even if the first observer P1 and the second observer P2 move at speeds different from each other.

When it is necessary to preferentially provide stereopsis to the first observer P1 over the second observer P2 and the relative speed between the eyes of the first observer P1 and the eyes of the second observer P2 is not zero, the display control portion 103 controls the display 101 so that at least one of the boundary between the first left-eye image ML1 and the second right-eye image MR2 and the boundary between the first right-eye image MR1 and the second left-eye image ML2 is moved on the basis of the first position data and the second position data. These boundaries are moved in the range where the first observer P1 can visually recognize the first right-eye image MR1 and the first left-eye image ML1.

Thereby, even if it is impossible to allow both the first observer P1 and the second observer P2 to visually recog-nize the stereoscopic image, the stereoscopic display device 100 can allow the first observer P1 to continuously visually recognize the stereoscopic image having high priority.

When it is necessary to preferentially provide stereopsis to the first observer P1 over the second observer P2 and the second observer P2 has entered a predetermined range from a range in which the first right-eye image MR1 is visually recognizable, the display control portion 103 controls the display 101 so that an aspect of at least a part of the second left-eye image ML2 is changed.

Thereby, when the second observer P2 has entered the predetermined range from a range in which the first right-eye image MR1 is visually recognizable, the stereoscopic display device 100 can warn the second observer P2 not to enter the predetermined range from the range in which the first right-eye image MR1 is visually recognizable. There-fore, the stereoscopic display device 100 can support a process of maintaining a situation in which both the first observer P1 and the second observer P2 can visually rec-ognize the stereoscopic image even if the second observer P2 enters the predetermined range from the range in which the first right-eye image MR1 is visually recognizable.

When the relative speed between the eyes of the first observer P1 and the eyes of the second observer P2 is zero, the display control portion 103 controls the display 101 so that the four boundaries are moved at a speed equal to the speed at which the eyes of the first observer P1 move and the speed at which the eyes of the second observer P2 move. The four boundaries mentioned here are the boundary between the first right-eye image MR1 and the first left-eye image ML1, the boundary between the first left-eye image ML1 and the second right-eye image MR2, the boundary between the first right-eye image MR1 and the second left-eye image ML2, and the boundary between the second right-eye image MR2 and the second left-eye image ML2.

Thereby, the stereoscopic display device 100 can cause the first observer P1 and the second observer P2 to visually recognize the stereoscopic image even if the first observer P1 and the second observer P2 move.

Second Embodiment

A display device according to a second embodiment will be described with reference to FIG. 9. Parts of the second embodiment different from those of the first embodiment will be described and redundant description of content overlapping that of the first embodiment will be omitted.

Figure 9:
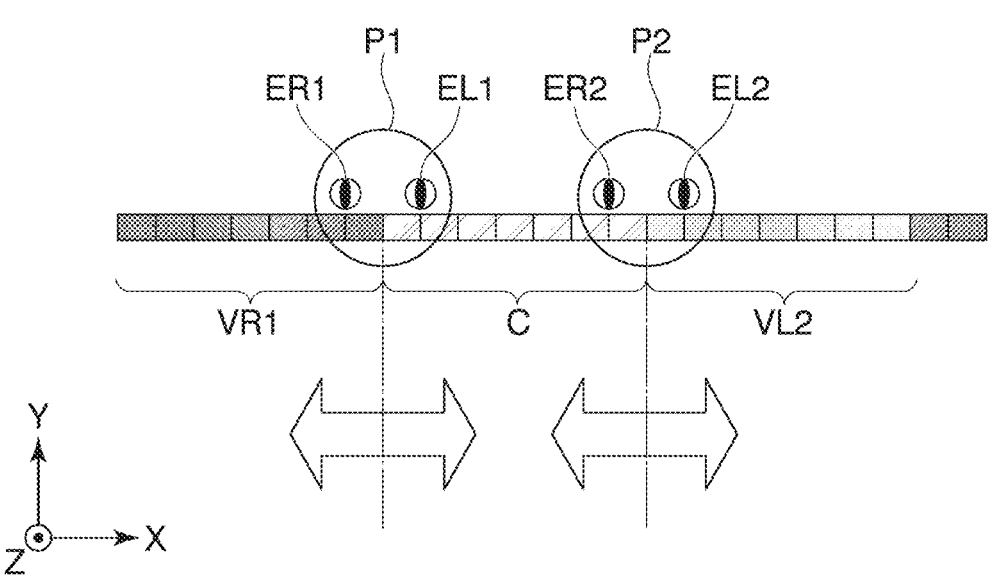
FIG. 9 A diagram showing an example of positional relationships of a first observer, a first right-eye viewpoint region, a second observer, a second left-eye viewpoint region, and a common viewpoint region according to a second embodiment.

FIG. 9 is a diagram showing an example of positional relationships of a first observer, a first right-eye viewpoint region, a second observer, a second left-eye viewpoint region, and a common viewpoint region according to the second embodiment. The display 101 displays, for example, a first right-eye image MR1, a common image C, and a second left-eye image ML2 shown in FIG. 9. The common image C is visually recognized by the left eye of the first observer P1 and the right eye of the second observer P2 and corresponds to a first left-eye image ML1 and a second right-eye image MR2 according to the first embodiment. The display control portion 103 replaces the first left-eye image ML1 and the second right-eye image MR2 according to the first embodiment with the common image C and executes a process identical to that of the first embodiment.

The stereoscopic display device 100 according to the second embodiment has been described above. The stereo-scopic display device 100 replaces the first left-eye image ML1 and the second right-eye image MR2 according to the first embodiment with the common image C and executes a process identical to that of the first embodiment. As a result, because it is only necessary for the stereoscopic display device 100 to display three images, i.e., the first right-eye image MR1, the common image C, and the second left-eye image ML2, instead of four images, i.e., the first right-eye image MR1, the first left-eye image ML1, the second right-eye image MR2, and the second left-eye image ML2, it is possible to further allow the first observer P1 and the second observer P2 to visually recognize a stereoscopic image with higher resolution.

Third Embodiment

A display device according to a third embodiment will be described with reference to FIG. 10. Parts of the third embodiment different from those of the first embodiment and the second embodiment will be described and redundant description of content overlapping that of the first embodiment or the second embodiment will be omitted.

FIG. 10 is a diagram showing an example of positional relationships of the first observer, the first right-eye viewpoint region, the first left-eye viewpoint region, the second observer, the second right-eye viewpoint region, and the second left-eye viewpoint region according to the third embodiment. As shown in FIG. 10, there may be at least one set of the first right-eye viewpoint region VR1, the first left-eye viewpoint region VL1, the second right-eye viewpoint region VR2, and the second left-eye viewpoint region VL2 between the first observer P1 and the second observer P2. The display control portion 103 may control the display 101 so that there is at least one set of the first right-eye viewpoint region VR1, the first left-eye viewpoint region VL1, the second right-eye viewpoint region VR2, and the second left-eye viewpoint region VL2 between the first observer P1 and the second observer P2.

As described above, the stereoscopic display device 100 according to the third embodiment has been described. The stereoscopic display device 100 controls the display 101 so that there is at least one set of the first right-eye viewpoint region VR1, the first left-eye viewpoint region VL1, the second right-eye viewpoint region VR2, and the second left-eye viewpoint region VL2 between the first observer P1 and the second observer P2. Thereby, the stereoscopic display device 100 can cause the first observer P1 and the second observer P2 to visually recognize a stereoscopic image even if the first observer P1 and the second observer P2 are far apart.

Although a case where the optical element 102 is a parallax barrier has been described as an example in the above-described embodiment, the disclosure is not limited thereto. The optical element 102 may be, for example, a lenticular lens.

Although the stereoscopic display device 100 can be originally observed by three or more observers, two observers, i.e., the first observer P1 and the second observer P2, in the embodiment have been described for the convenience of description.

Although a case where the first observer P1 and the second observer P2 can observe the stereoscopic display device 100 has been described in the above-described example, the disclosure is not limited thereto. The stereoscopic display device 100 may be observed by three or more observers.

That is, the above-described first observer P1 may be generalized as an $h^{th}$ (h is a natural number) observer and the above-described second observer P2 may be generalized as a $(h+1)^{th}$ observer.

Moreover, when the above-described first right-eye image MR1 is a right-eye image for the $h^{th}$ observer, the first right-eye image MR1 may be generalized as the first $(2h-1)^{th}$ image. Likewise, when the first left-eye image ML1 is a left-eye image for the $h^{th}$ observer, the first left-eye image ML1 may be generalized as a $(2h)^{th}$ image.

For example, when the first observer P1 is designated as a third observer and the second observer P2 is designated as a fourth observer (i.e., h=3), a $(2h-1)^{th}$ image (i.e., a fifth image) corresponds to the first right-eye image MR1, and a $(2h)^{th}$ image (i.e., a sixth image) corresponds to the first left-eye image ML1. Moreover, in this case (i.e., when h=3), a $(2(h+1)-1)^{th}$ image (i.e., a seventh image) corresponds to the second right-eye image MR2 and a $(2(h+1))^{th}$ image (i.e., an eighth image) corresponds to the second left-eye image ML2.

Moreover, when the first observer P1 is the $h^{th}$ (h is a natural number) observer and the second observer P2 is generalized as the $(h+1)^{th}$ observer, the number of pixels can be generalized and expressed as follows.

That is, the number of pixels for displaying the first right-eye image MR1 (i.e., the $(2h-1)^{th}$ image) of the $h^{th}$ observer can be denoted by $(n_{(2h-1)})$. Moreover, the number of pixels for displaying the first left-eye image ML1 (i.e., a $(2h)^{th}$ image) of the $h^{th}$ observer can be denoted by $(n_{(2h)})$.

For example, when the first observer P1 is designated as the third observer and the second observer P2 is designated as the fourth observer (i.e., h=3), the number of pixels for displaying the first right-eye image MR1 (i.e., the fifth image) of the first observer P1 can be denoted by $(n_5)$. Moreover, the number of pixels for displaying the first left-eye image ML1 (i.e., the sixth image) of the first observer P1 can be denoted by $(n_6)$. Moreover, in this case, the number of pixels for displaying the second right-eye image MR2 (i.e., the seventh image) of the second observer P2 can be denoted by $(n_7)$. Moreover, the number of pixels for displaying the second left-eye image ML2 (i.e., the eighth image) of the second observer P2 can be denoted by $(n_8)$.

Moreover, the observers including the first observer P1 and the second observer P2 described above can be generalized as a "plurality of observers." In this case, the configuration of the present embodiment can be generalized and expressed as follows.

A stereoscopic display device includes an optical element, a display, and a display control portion.

The optical element restricts a position where each of parallax images observed in correspondence with eyes of a plurality of observers is visually recognizable.

The display has a display surface including a plurality of pixels arranged in a first direction and a second direction intersecting the first direction and displays the parallax images on the display surface.

The display control portion performs a control process so that a width of a viewpoint region where the parallax image is visually recognizable is wider than at least a distance between a right eye and a left eye of each observer, each parallax image is displayed on q (q: a natural number of 4 or more) consecutive pixels in accordance with an angle of the optical element based on the second direction, and the width of the viewpoint region of the parallax image is changed in correspondence with position information of each observer.

Moreover, the display control portion of the stereoscopic display device may be configured to perform a control process so that the width of the viewpoint region of the parallax image is changed without changing the total number of consecutive pixels q (q: a natural number).

The embodiments of the disclosure have been described above with reference to the drawings. However, the stereoscopic display device is not limited to the above-described embodiments and at least one of various variations, substitutions, combinations, and design changes can be applied without departing from the spirit or scope of the disclosure.

Moreover, the above-described effects of the embodiment of the disclosure have been described as an example. Thus, the embodiments of the disclosure may have other effects that can be recognized by those skilled in the art from the description of the above-described embodiments in addition to the above-described effects.

REFERENCE SIGNS LIST

100 Stereoscopic display device
101 Display
102 Optical element
103 Display control portion

The invention claimed is:

1. A stereoscopic display device for multiple observers capable of being visually recognized by a plurality of observers, the stereoscopic display device comprising:
   an optical element configured to restrict a $(2h-1)^{th}$ image visually recognized by a right eye of an $h^{th}$ (h: a natural number) observer and a $2h^{th}$ image visually recognized by a left eye of the $h^{th}$ observer to a position where visual recognition of the $h^{th}$ observer is possible;
   a display having a display surface including a plurality of pixels arranged in a first direction and a second direction intersecting the first direction and configured to display the $(2h-1)^{th}$ image and the $2h^{th}$ image on the display surface; and
   a display controller operable to detect a relative position between the eyes of the $h^{th}$ observer and the eyes of a second observer, the display controller being further configured to control the display so that
   at least one of a $(2h-1)^{th}$ viewpoint region where the $(2h-1)^{th}$ image is visually recognizable and a $2h^{th}$ viewpoint region where the $2h^{th}$ image is visually recognizable is wider than a distance between the right eye and the left eye of the $h^{th}$ observer,
   the $(2h-1)^{th}$ image is displayed on (n (2h-1)) consecutive pixels and the $2h^{th}$ image is displayed on $(n_{(2h)})$ consecutive pixels in accordance with an angle of the optical element based on the second direction, and
   a position of at least one of a $(2h-1)^{th}$ interocular boundary that is a boundary between the right eye and the left eye of the $h^{th}$ observer and a $(2h-1)^{th}$ interobserver boundary that is a boundary between the $h^{th}$ observer and an $(h+1)^{th}$ observer is moved on the basis of position data indicating positions of the eyes of the $h^{th}$ observer.

2. The stereoscopic display device for multiple observers according to claim 1, wherein the display control controls the display so that the total number of the $(n_{(2h-1)})$ consecutive pixels and the $(n_{(2h)})$ consecutive pixels remains uniform all the time.

3. The stereoscopic display device for multiple observers according to claim 1, wherein, when it is necessary to preferentially provide stereopsis to the $h^{th}$ observer over the $(h+1)^{th}$ observer and the $(h+1)^{th}$ observer has entered a predetermined range from a range in which the $(2h-1)^{th}$ image is visually recognizable, the display control controls the display so that an aspect of at least a part of the $(2(h+1))^{th}$ image or the $(2(h+1)-1)^{th}$ image is changed.

4. The stereoscopic display device for multiple observers according to claim 1, wherein, when the $h^{th}$ observer is closer to the display than a position at an optimal observation distance or when the $h^{th}$ observer is farther from the display than the position at the optimal observation distance,
   the display control controls the display so that a reference point at which a straight line passing through a point between the right eye and the left eye of the $h^{th}$ observer and a boundary between the $(2h-1)^{th}$ viewpoint region of the $h^{th}$ observer and the $2h^{th}$ viewpoint region of the $h^{th}$ observer intersects the display and a reference point at which a straight line passing through the point between the right eye and the left eye of the $h^{th}$ observer and a boundary between unit regions constituting the $(2h-1)^{th}$ viewpoint region or a boundary between unit regions constituting the $2h^{th}$ viewpoint region intersects the display are identified and the $(2h-1)^{th}$ image of the $h^{th}$ observer and the $2h^{th}$ image of the $h^{th}$ observer are displayed at a distance equal to an interval between two reference points adjacent to each other.

5. A stereoscopic display device for multiple observers comprising:
   an optical element configured to restrict a position where each of a first right-eye image visually recognized by a right eye of a first observer, a first left-eye image visually recognized by a left eye of the first observer, a second right-eye image visually recognized by a right eye of a second observer, and a second left-eye image visually recognized by a left eye of the second observer is visually recognizable;
   a display having a display surface including a plurality of pixels arranged in a first direction and a second direction intersecting the first direction and configured to display the first right-eye image, the first left-eye image, the second right-eye image, and the second left-eye image on the display surface; and
   a display controller operable to detect a relative position between the eyes of the first observer and the eyes of the second observer, the display controller further being configured to control the display so that at least one of a first right-eye viewpoint region where the first right-eye image is visually recognizable and a first left-eye viewpoint region where the first left-eye image is visually recognizable is wider than a distance between the right eye and the left eye of the first observer, at least one of a second right-eye viewpoint region where the second right-eye image is visually recognizable and a second left-eye viewpoint region where the second left-eye image is visually recognizable is wider than a distance between the right eye and the left eye of the second observer, the first right-eye image is displayed on n (n: a natural number) consecutive pixels in accordance with an angle of the optical element based on the second direction, the first left-eye image is displayed on m (m: a natural number) consecutive pixels, the second right-eye image is displayed on k (k: a natural number) consecutive pixels, the second left-eye image is displayed on p (p: a natural number) consecutive pixels, and a position of at least one of a boundary between the first right-eye image and the first left-eye image, a boundary between the first left-eye image and the second right-eye image, a boundary between the first right-eye image and the second left-eye image, and a boundary between the second right-eye image and the second left-eye image is moved on the basis of first position data indicating positions of the eyes of the first observer and second position data indicating positions of the eyes of the second observer.

6. The stereoscopic display device for multiple observers according to claim 5, wherein the display controller controls the display so that a sum of the number of consecutive pixels n, the number of consecutive pixels m, the number of consecutive pixels k, and the number of consecutive pixels p remains uniform all the time, at least two of the number of consecutive pixels n, the number of consecutive pixels m, the number of consecutive pixels k, and the number of consecutive pixels p are changed on the basis of a position of the first observer and a position of the second observer, and each of (n+m) and (k+p) remains uniform in accordance with a boundary position between the first left-eye image and the second right-eye image.

7. The stereoscopic display device for multiple observers according to claim 5, wherein, when the relative position between the eyes of the first observer and the eyes of the second observer is detected to be changed, the display controller controls the display so that a boundary between the first right-eye image and the first left-eye image is moved on the basis of the first position data in a range wider than a distance that is twice a distance between the right eye and the left eye of the first observer and a boundary between the second right-eye image and the second left-eye image is moved on the basis of the second position data in a range wider than a distance that is twice a distance between the right eye and the left eye of the second observer.

8. The stereoscopic display device for multiple observers according to claim 5, wherein, when the relative position between the eyes of the first observer and the eyes of the second observer is detected to be changed, the display controller controls the display so that at least one of a boundary between the first left-eye image and the second right-eye image and a boundary between the first right-eye image and the second left-eye image is moved on the basis of the first position data and the second position data in a range in which the first observer is able to visually recognize the first right-eye image and the first left-eye image and the second observer is able to visually recognize the second right-eye image and the second left-eye image.

9. The stereoscopic display device for multiple observers according to claim 5, wherein, when it is necessary to preferentially provide stereopsis to the first observer over the second observer and when the relative position between the eyes of the first observer and the eyes of the second observer is detected to be changed, the display controller controls the display so that at least one of a boundary between the first left-eye image and the second right-eye image and a boundary between the first right-eye image and the second left-eye image is moved on the basis of the first position data and the second position data in a range in which the first observer is able to visually recognize the first right-eye image and the first left-eye image.

10. The stereoscopic display device for multiple observers according to claim 5, wherein, when it is necessary to preferentially provide stereopsis to the first observer over the second observer and the second observer has entered a predetermined range from a range in which the first right-eye image is visually recognizable, the display controller controls the display so that an aspect of at least a part of the second left-eye image or the second right-eye image is changed.

11. The stereoscopic display device for multiple observers according to claim 5, wherein, when the relative position between the eyes of the first observer and the eyes of the second observer is detected not to be changed, the display controller controls the display so that the boundary between the first right-eye image and the first left-eye image, the boundary between the first left-eye image and the second right-eye image, the boundary between the first right-eye image and the second left-eye image, and the boundary between the second right-eye image and the second left-eye image are moved at a speed equal to a speed at which the eye of the first observer moves and a speed at which the eye of the second observer moves.

12. The stereoscopic display device for multiple observers according to claim 5, wherein, when the first observer is closer to the display than a position at an optimal observation distance or when the first observer is farther from the display than the position at the optimal observation distance, the display controller controls the display so that a reference point at which a straight line passing through a point between the right eye and the left eye of the first observer and a boundary between the first right-eye viewpoint region and the first left-eye viewpoint region intersects the display and a reference point at which a straight line passing through the point between the right eye and the left eye of the first observer and a boundary between unit regions constituting the first right-eye viewpoint region or a boundary between unit regions constituting the first left-eye viewpoint region intersects the display are identified and the first right-eye image and the first left-eye image are displayed at a distance equal to an interval between two reference points adjacent to each other.

13. The stereoscopic display device for multiple observers according to claim 5, wherein, when the second observer is closer to the display than a position at an optimal observation distance or when the second observer is farther from the display than the position at the optimal observation distance, the display controller controls the display so that a reference point at which a straight line passing through a point between the right eye and the left eye of the second observer and a boundary between the second right-eye viewpoint region and the second left-eye viewpoint region intersects the display and a reference point at which a straight line passing through the point between the right eye and the left eye of the second observer and a boundary between unit regions constituting the second right-eye viewpoint region or a boundary between unit regions constituting the second left-eye viewpoint region intersects the display are identified and the second right-eye image and the second left-eye image are displayed at a distance equal to an interval between two reference points adjacent to each other.

14. The stereoscopic display device for multiple observers according to claim 5, wherein both the first left-eye image and the second right-eye image are common images visually recognized by the left eye of the first observer and the right eye of the second observer.

15. A stereoscopic display device for multiple observers comprising:

an optical element configured to restrict a position where each of parallax images observed in correspondence with eyes of a plurality of observers is visually recognizable;

a display having a display surface including a plurality of pixels arranged in a first direction and a second direction intersecting the first direction and configured to display the parallax images on the display surface; and a display controller operable to detect a relative position between the eyes of a first observer and the eyes of a second observer is detected configured to perform a control process so that a width of a viewpoint region where the parallax image is visually recognizable is wider than at least a distance between a right eye and a left eye of each observer, each parallax image is displayed on q (q: a natural number of 4 or more) consecutive pixels in accordance with an angle of the optical element based on the second direction, and the width of the viewpoint region of the parallax image is changed in correspondence with position information of each observer.

16. The stereoscopic display device for multiple observers according to claim 15, wherein the display controller performs a control process so that the width of the viewpoint region of the parallax image is changed without changing the total number of consecutive pixels that is q.

\* \* \* \* \*